US011475651B2

(12) United States Patent
Huo et al.

(10) Patent No.: US 11,475,651 B2
(45) Date of Patent: *Oct. 18, 2022

(54) WINDOW-SHAPING VIRTUAL REALITY SYSTEM

(71) Applicant: Purdue Research Foundation, West Lafayette, IN (US)

(72) Inventors: Ke Huo, West Lafayette, IN (US); Vinayak Raman Krishnamurthy, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,890

(22) Filed: Apr. 2, 2020

(65) Prior Publication Data

US 2021/0090349 A1    Mar. 25, 2021

Related U.S. Application Data

(63) Continuation of application No. 15/925,758, filed on Mar. 19, 2018, now Pat. No. 10,643,397.
(Continued)

(51) Int. Cl.
*G06T 19/20* (2011.01)
*G06F 3/04883* (2022.01)
(Continued)

(52) U.S. Cl.
CPC .......... *G06T 19/20* (2013.01); *G06F 3/04815* (2013.01); *G06F 3/04883* (2013.01);
(Continued)

(58) Field of Classification Search
CPC . G06F 2203/04104; G06F 2203/04808; G06F 3/03545; G06F 3/041;
(Continued)

(56) References Cited

U.S. PATENT DOCUMENTS 9,348,411 B2 * 5/2016 Paek ...................... G06F 3/147
9,530,250 B2   12/2016 Mazula
(Continued)

FOREIGN PATENT DOCUMENTS

WO    2014/182545 A1    11/2014

OTHER PUBLICATIONS

Song, H., et al., "Modelcraft: Capturing freehand annotations and edits on physical 3d models", in Proceedings of the 19th Annual ACM Symposium on User Interface Software and Technology, UIST '06, (New York, Ny, USA), pp. 13-22, ACM, 2006.
(Continued)

*Primary Examiner* — Dmitriy Bolotin
(74) *Attorney, Agent, or Firm* — Purdue Research Foundation

(57) ABSTRACT

A virtual reality system, comprising an electronic 2d interface having a depth sensor, the depth sensor allowing a user to provide input to the system to instruct the system to create a virtual 3D object in a real-world environment. The virtual 3D object is created with reference to at least one external physical object in the real-world environment, with the external physical object concurrently displayed with the virtual 3D object by the interface. The virtual 3D object is based on physical artifacts of the external physical object.

11 Claims, 17 Drawing Sheets

Related U.S. Application Data

(60) Provisional application No. 62/473,465, filed on Mar. 19, 2017.

(51) Int. Cl.

| | | |
|---|---|---|
| *G06T 17/20* | (2006.01) | |
| *G06F 3/04815* | (2022.01) | |
| *G06T 15/04* | (2011.01) | |
| *G06T 19/00* | (2011.01) | |
| G06F 3/0354 | (2013.01) | |
| G06F 3/0482 | (2013.01) | |
| G06T 7/40 | (2017.01) | |
| G06T 7/13 | (2017.01) | |
| G06F 3/041 | (2006.01) | |

(52) U.S. Cl.
CPC .............. *G06T 15/04* (2013.01); *G06T 17/20* (2013.01); *G06T 19/006* (2013.01); *G06F 3/03545* (2013.01); *G06F 3/041* (2013.01); *G06F 3/0482* (2013.01); *G06F 2203/04104* (2013.01); *G06F 2203/04808* (2013.01); *G06T 7/13* (2017.01); *G06T 7/40* (2013.01); *G06T 2207/10028* (2013.01); *G06T 2219/2004* (2013.01); *G06T 2219/2016* (2013.01); *G06T 2219/2021* (2013.01)

(58) Field of Classification Search
CPC .............. G06F 3/04815; G06F 3/0482; G06F 3/04883; G06T 15/04; G06T 17/20; G06T 19/006; G06T 19/20; G06T 2207/10028; G06T 2219/2004; G06T 2219/2016; G06T 2219/2021; G06T 7/13; G06T 7/40
See application file for complete search history.

(56) References Cited

U.S. PATENT DOCUMENTS

| | | | | |
|---|---|---|---|---|
| 2013/0004060 A1* | 1/2013 | Bell | ..................... | H04N 13/257 382/154 |
| 2013/0342570 A1* | 12/2013 | Kinnebrew | ............ | G09G 3/003 345/633 |
| 2014/0292645 A1* | 10/2014 | Tsurumi | .................... | G06T 7/70 345/156 |
| 2016/0005229 A1* | 1/2016 | Lee | ....................... | G06F 3/0488 345/419 |
| 2016/0012644 A1 | 1/2016 | Lam et al. | | |
| 2016/0292927 A1 | 10/2016 | Finn et al. | | |

OTHER PUBLICATIONS

Sodhi, R., et al., "Bethere: 3d mobile collaboration with spatial input," in Proceedings of the SIGCHI Conference on Human Factors in Computing Systems, CHI '13, (New York, NY, USA), pp. 179-188, ACM, 2013.
Weichel, C., et al., "Mixfab: A mixed-reality environment for personal fabrication," in Proceedings of the 32Nd Annual ACM Conference on Human Factors in Computing Systems, CHI '14, (New York, NY, USA), pp. 3855-3864, ACM, 2014.
Zund, F., et al., "Augmented creativity: Bridging the real and virtual worlds to enhance creative play," in SIGGRAPH Asia 2015 Mobile Graphics and Interactive Applications, SA '15, (New York, NY, USA), pp. 21:1-21:7, ACM, 2015.
Lau, M., et al., "Modeling-in-context: User design of complementary objects with a single photo," in Proceedings of the Seventh Sketch-Based Interfacesand Modeling Symposium, SBIM '10, pp. 17-24, Eurographics Association, 2010.
Zheng, Y., et al., "Smartcanvas: Context-inferred interpretation of sketches for preparatory design studies," in Computer Graphics Forum, vol. 35, pp. 37-48, Wiley Online Library, 2016.
Chen, T., et al., "3sweep: Extracting editable objects from a single photo," ACM Transactions on Graphics (TOG)—Proceedings of ACM SIGGRAPH Asia 2013, vol. 32, pp. 195:1-195:10, Nov. 2013.
Paczkowski, P., et al., "Insitu: sketching architectural designs in context.," ACM Trans. Graph., vol. 30, No. 6, p. 182, 2011.
Hengel, A., et al., "Videotrace: Rapid interactive scene modelling from video," in ACM SIGGRAPH 2007 Papers, SIGGRAPH '07, (New York, NY, USA), 2007.
Chen, X., et al., "Garment modeling with a depth camera," ACM Transactions on Graphics (TOG), vol. 34, No. 6, p. 203, 2015.
Gannon, M., et al., "Tactum: A skin-centric approach to digital design and fabrication," in Proceedings of the 33rd Annual ACM Conference on Human Factors in Computing Systems, pp. 1779-1788, ACM, 2015.
Arisandi, R., et al., "Virtual handcrafting: Building virtual wood models using tooldevice," Proceedings of the IEEE, vol. 102, No. 2, pp. 185-195, 2014.
Nuernberger, B., et al., "Interpreting 2d gesture annotations in 3d augmented reality," in 2016 IEEE Symposium on 3D User Interfaces (3DUI), pp. 149-158, IEEE, 2016.
Nuernberger, B., et al., "Snaptoreality: Aligning augmented reality to the real world," in Proceedings of the 2016 CHI Conference on Human Factors in Computing Systems, pp. 1233-1244, ACM, 2016.
Lau, M., et al., "Situated modeling: A shape-stamping interface with tangible primitives," in ACM Conference on Tangible, Embedded and Embodied Interaction (TEI '12), pp. 275-282, 2012.
Xin, M., et al., "Napkin sketch: Handheld mixed reality 3d sketching," in Proceedings of the 2008 ACM Symposium on Virtual Reality Software and Technology, VRST '08, (New York, NY, USA), pp. 223-226, ACM, 2008.
Sachs, E., "3-draw: A tool for designing 3d shapes," IEEE Computer Graphics and Applications, vol. 11, No. 6, pp. 18-26, 1991.
Fiorentino, M., et al., "Spacedesign: A mixed reality workspace for aesthetic industrial design," in Proceedings of the 1st International Symposium on Mixed and Augmented Reality, p. 86, IEEE Computer Society, 2002.
Vinayak, et al., "Mobisweep: Exploring spatial design ideation using a smartphone as a hand-held reference plane," in Proceedings of the TEI '16: Tenth International Conference on Tangible, Embedded, and Embodied Interaction, TEI 16, (New York, NY, USA), pp. 12-20, ACM, 2016.
Piya, C., et al., "Realfusion: An interactive workflow for repurposing realworld objects towards early-stage creative ideation," in Proceedings of Graphics Interface 2016, ACM, 2016.
Schkolne, S., et al., "Surface drawing: creating organic 3d shapes with the hand and tangible tools," in Proceedings of the SIGCHI conference on Human factors in computing systems, pp. 261-268, ACM, 2001.
Lakatos, D., et al., "T(ether): Spatially-aware handhelds, gestures and proprioception for multi-user 3d modeling and animation," in Proceedings of the 2nd ACM Symposium on Spatial User Interaction, SUI '14, (New York, NY, USA), pp. 90-93, ACM, 2014.
Kasahara., S., et al., "Second surface: multi-user spatial collaboration system based on augmented reality," in SIGGRAPH Asia 2012 Emerging Technologies, p. 20, ACM, 2012.
Olsen, L., et al., "Naturasketch: Modeling from images and natural sketches," IEEE Comput. Graph. Appl., vol. 31, pp. 24-34, Nov. 2011.
Igarashi, T., et al., "Teddy: a sketching interface for 3d freeform design," in Acm siggraph 2007 courses, p. 21, ACM, 2007.
Rother, C., et al., "GrabCut"—Interactive foreground extraction using iterated graph cuts, ACM Trans. Graph., vol. 23, pp. 309-314, Aug. 2004.
Thiel, Y., et al., "Elasticurves: Exploiting stroke dynamics and inertia for the real-time neatening of sketched 2d curves," in Proc. of UIST, pp. 383-392, ACM, 2011.
Keefe, D., et al., "Cavepainting: a fully immersive 3d artistic medium and interactive experience," in Proceedings of the 2001 symposium on Interactive 3D graphics, pp. 85-93, ACM, 2001.

* cited by examiner

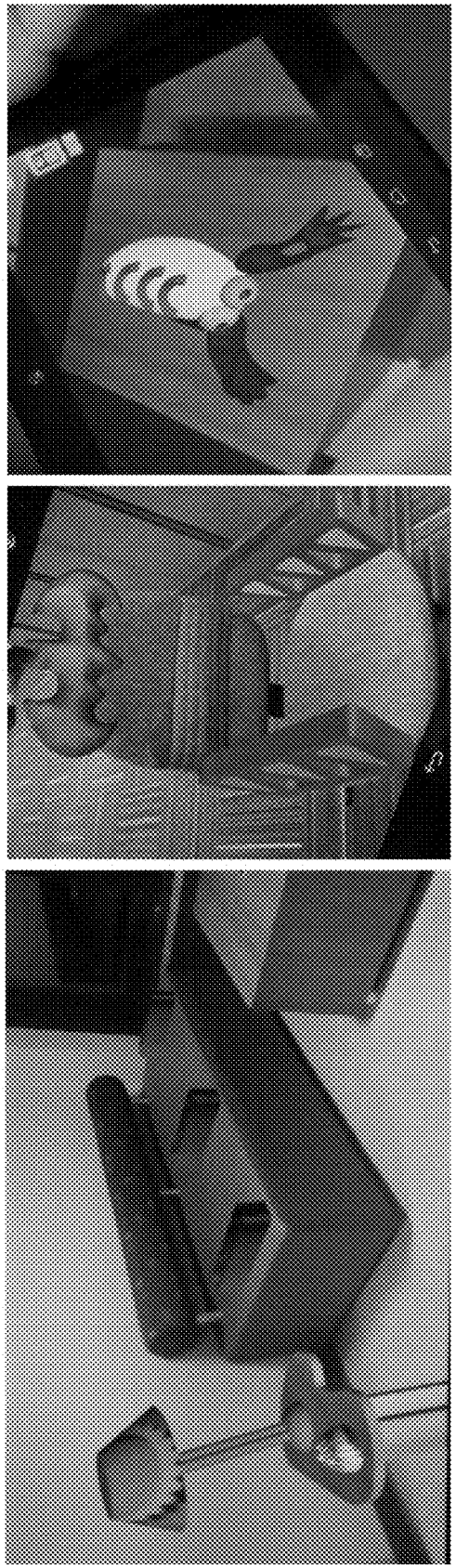

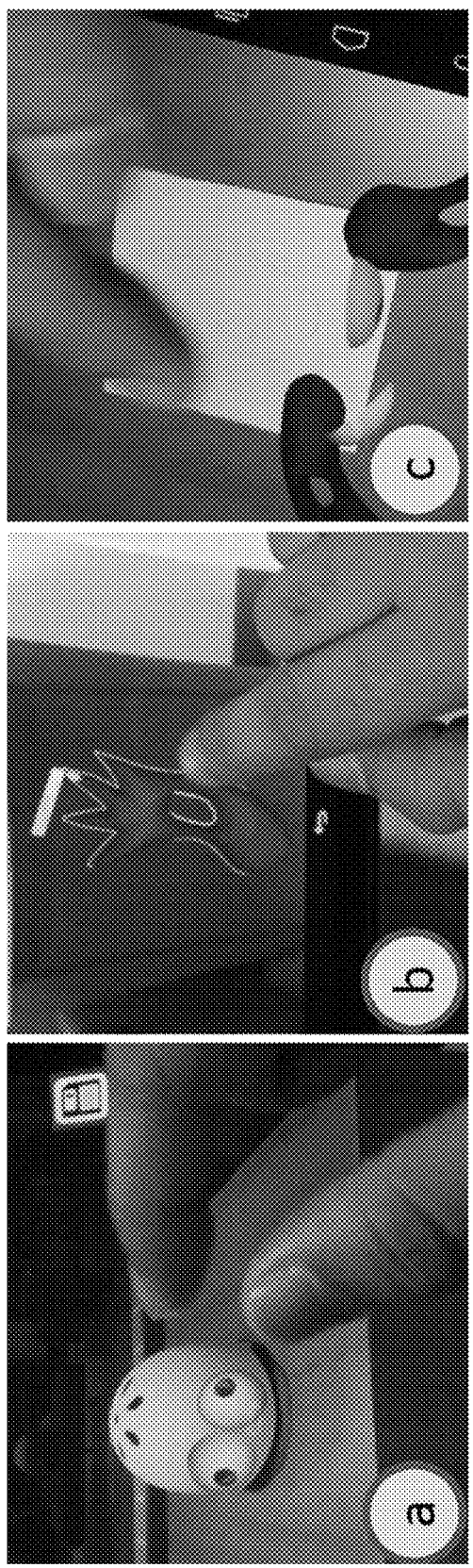

WINDOW-SHAPING VIRTUAL REALITY SYSTEM

The present patent application is a continuation of U.S. Patent No. 10,643,397, issued May 5, 2020, which is related to and claims the priority benefit of U.S. Provisional Patent Application No. 62/473,465, filed Mar. 19, 2017 the contents of which are incorporated in their entirety herein by reference.

CROSS-REFERENCE TO RELATED APPLICATIONS

The present patent application is a continuation of U.S. patent application Ser. No. 15/925,758 filed Mar. 19, 2018, which is related to and claims the priority benefit of U.S. Provisional Patent Application Ser. No. 62/473,465 filed Mar. 19, 2017 the contents of which are incorporated in their entirety herein by reference.

STATEMENT REGARDING GOVERNMENT FUNDING

This invention was made with government support under Contract No. IIP-1632154 awarded by the National Science Foundation. The government has certain rights in the invention.

TECHNICAL FIELD

This disclosure generally relates to virtual reality systems, and more specifically, to virtual reality computer system which allows creation and visualization of shapes directly on a surface of an existing real-world object in the virtual space.

BACKGROUND

This section introduces aspects that may help facilitate a better understanding of the disclosure. Accordingly, these statements are to be read in this light and are not to be understood as admissions about what is or is not prior art.

Human capabilities enabled by visual, aural, tactile, kinesthetic, and spatial perceptions are underutilized by digital media for artifact creation. To cooperate with an increasingly growing world of digital manufacturing/fabricating, humans have been forced to use multi-step, tedious, and cumbersome interactions with the associated virtual design and display systems. In such processes, natural modes of thinking and communication are fractured because of: (1) switching between tangible instruments such as measurement and input devices like keyboards and mice, and (2) limitations in visual perception of virtual representations of physical artifacts. These discontinuities in interactions are a result of background representations and modalities for information exchange used by these machines and devices. For example, the design environment is typically implemented through a 2D Windows-Icons-Menus-Pointers (WIMP) manner which requires extensive training and inhibit users ability to create virtual 3D shapes in a simple manner. Moreover, such virtual design environment is isolated from the design context which results in the visual perception of virtual contents separates from the physical artifacts and the surrounding environment. The physical environment often serves as a means for inspiring, contextualizing, and guiding the designer's thought process for expressing creative ideas. In early design processes, objects are frequently used as references to explore the space of novel designs.

Emerging mobile devices further led to a distributive change in the way users create, manipulate, and share digital information. Methods for using mobile devices for design environments and interfaces have been recently proposed. Although, these works leverage the ubiquity of mobile devices, they haven't addressed the fragmented virtual design environment and the physical design context. Recent works have shown that through-the-screen Augmented Reality (AR) and Mixed Reality (MR) can play a vital role in bridging the gap between the physical and digital worlds for creative expression of ideas. However, most of these approaches use the physical environment mainly as a dormant container of digital artifacts rather than as a source of inspiration for facilitating quick digital prototyping for design ideation. Therefore, improvements are needed in the field.

BRIEF DESCRIPTION OF DRAWINGS

FIG. 9a shows a first example of the expressive capabilities enabled by the Window-Shaping design workflow according to one embodiment. FIG. 9b shows a second example of the expressive capabilities enabled by the Window-Shaping design workflow according to one embodiment. FIG. 9c shows a third example of the expressive capabilities enabled by the Window-Shaping design workflow according to one embodiment.

FIG. 11a shows a first step of a "creature" design use case wherein the eyes of the creature are created referring to a helmet. FIG. 11b shows a second step wherein the creature limbs are created referring to a trash can. FIG. 11c shows a third step wherein the creature body is created referring to a piece of white paper.

DETAILED DESCRIPTION

Figure 1A:
FIG. 1a shows a virtual representation wherein users simply draw a curve on the screen.
Figure 1B:
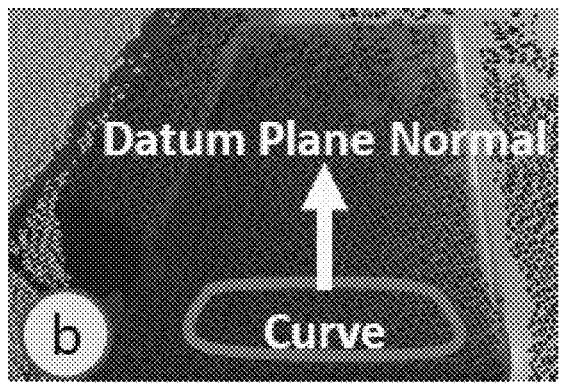
FIG. 1b shows a mapping to a 3D planar curve using a point cloud.
Figure 1C:
FIG. 1c shows the 3D curve is inflated into a 3D model.
Figure 1D:
FIG. 1d shows how users manipulate the shapes through a multi-touch interaction scheme.
Figure 1E:
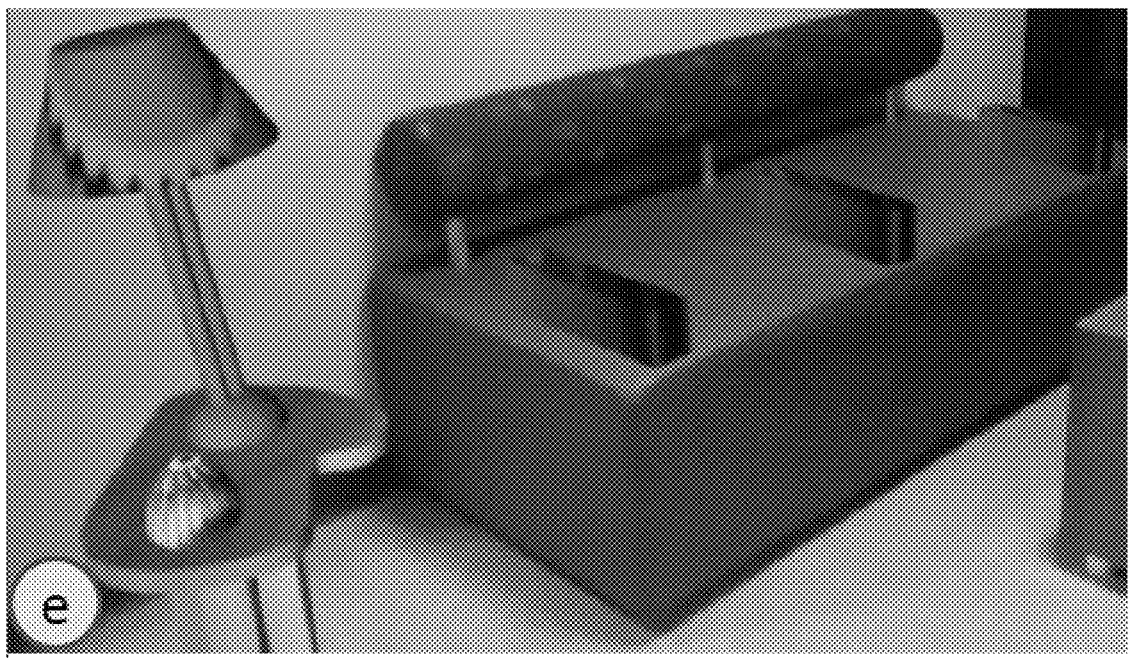
FIG. 1e shows a screenshot illustrating how Window-Shaping enables quick creation of virtual artifacts for augmenting the physical environment by borrowing dimensional and textural attributes from objects.
Figure 2A:
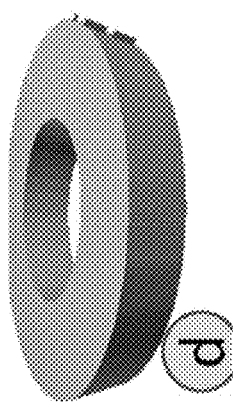
FIG. 2a shows a virtual display rendering of a circular geometric primitive and associated inflation function in Window-Shaping.
Figure 2B:
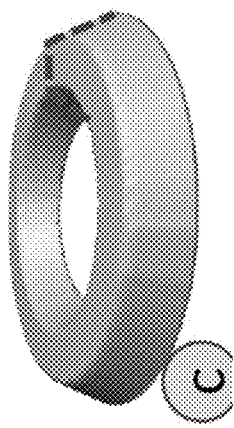
FIG. 2b shows a virtual display rendering of a conical geometric primitive and associated inflation function in Window-Shaping.
Figure 2C:
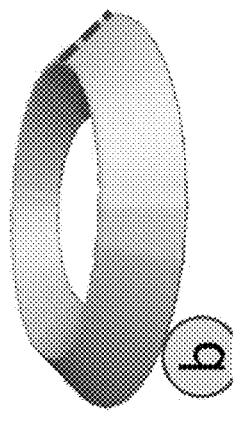
FIG. 2c shows a virtual display rendering of a tapered geometric primitive and associated inflation function in Window-Shaping.
Figure 2D:
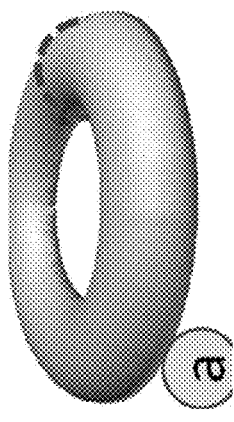
FIG. 2d shows a virtual display rendering of a linear geometric primitive and associated inflation function in Window-Shaping.

For the purposes of promoting an understanding of the principles of the disclosure, reference will now be made to the embodiments described in this description and specific language will be used to describe the same. It will nevertheless be understood that no limitation of the scope of the disclosure is thereby intended, such alterations and further modifications in the illustrated embodiments, and such further applications of the principles of the disclosure as described therein being contemplated as would normally occur to one skilled in the art to which the disclosure relates.

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

The presently disclosed system 1800 and interface may comprise, for example, a hand-held device (e.g., Google Tango), that serves as a local interface between the physical environment and the user. The simultaneous localization and mapping (SLAM) algorithm available with the Tango API allows for the acquisition of a point-cloud of the scene with respect to the global coordinate system. The resulting RGB-XYZ data allows users to implicitly define planes on any physical surface by simply drawing on the physical scene. Any touch input on the device screen can be unprojected on the physical environment to obtain a 3D point along with its normal in the global (world) coordinate system (as shown in FIG. 1). This helps users define a plane at any recognized point on a physical surface. Below, we describe the design goals, modeling metaphor, and user interactions.

The presently disclosed system 1800 provides integration of physical objects into the design process, and supports quick design ideation by allowing users to (a) quickly create 3D geometry in reference to physical artifacts, (b) borrow shape and appearance from physical artifacts to re-purpose them for design exploration, and (c) inspect the virtual artifacts in the physical context from different views in order to make design modifications, as discussed further below.

The design workflow behind the presently disclosed system 1800 comprises three interaction modes, namely: (a) inspection mode, (b) curve mode, and (c) shape mode. The inspection mode is a default state that allows for basic operations such as adding new shapes to the environment, inspecting the shape created by users and looking around the physical environment during the design process. Once the intent for shape addition is detected, the curve mode is activated and the user selects one of the four primitive types (see FIG. 2) offered in the application. Following this, the user can create sketches in three ways: drawing, selecting from template curves, or using GrabCut to extract outlines of physical shapes. Additionally, the user can also re-shape, rotate, translate, and scale the curve on the plane using one and two finger interactions. Upon finalizing the curve, an inflated shape is created and the application is set to the stand-by mode with the inflated shape rendered on the scene. While in the inspection mode, selecting an existing shape activates the shape mode. In the shape mode, the user can perform five operations on the selected mesh, namely, 3D placement, planar transformations, copying, patterning, and deletion. After the shapes being created, the system 1800 allows users to edit shapes from different perspectives and various distances.

Figures 3A, 3B, 3C, 3D:
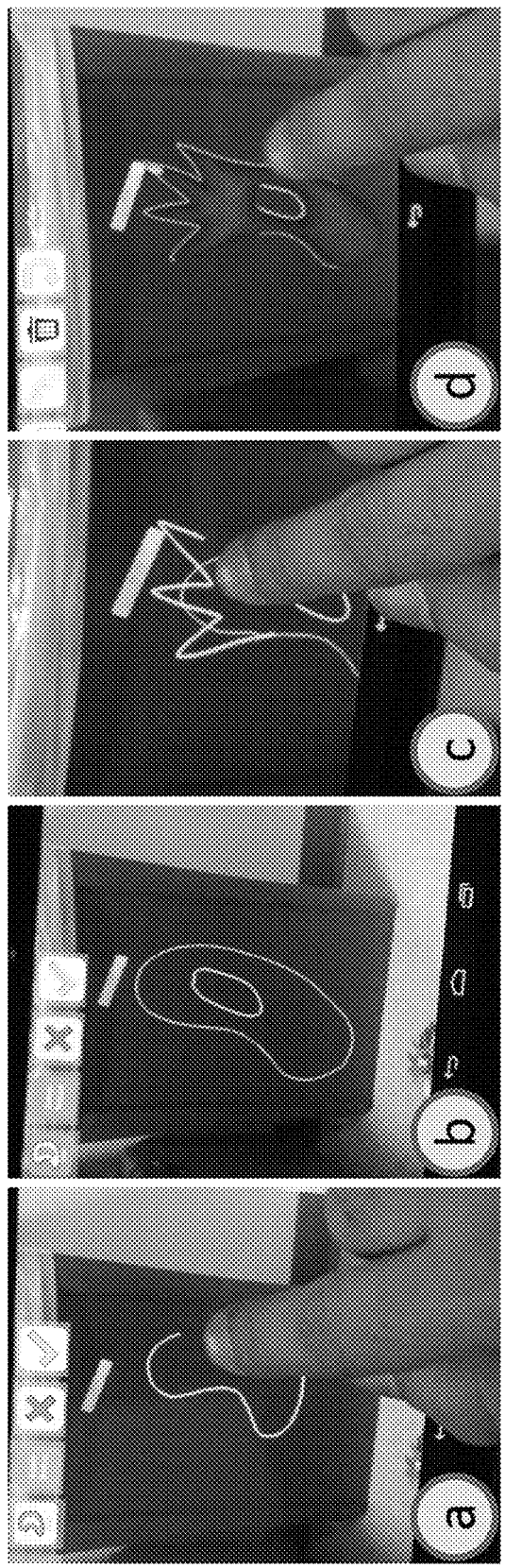
FIG. 3a shows use of a virtual reality system wherein a user sketches a boundary curve on a physical object in the curve mode.
FIG. 3b shows use of the virtual reality system wherein the user sketches a hole curve on the physical object in the curve mode.
FIG. 3c shows use of the virtual reality system wherein the user edits the sketched curves to add local details.
FIG. 3d shows use of the virtual reality system wherein the user obtains an inflated circular shape according to one embodiment.

Projective Sketching:

The presently disclosed system 1800 allows for direct one finger drawing on the tablet screen. The user first selects a primitive type and subsequently draws a sketch on the tablet. Once finalized, the sketched curve is un-projected on the physical scene and is converted and rendered in the scene as a 3D inflated mesh (FIG. 3). In one embodiment, all curves reside in a plane that is implicitly estimated from the user's 2D drawing. The first curve drawn by the user is by default the one and the only boundary curve. Once a boundary curve has been defined, multiple hole curves can be drawn inside the boundary (FIG. 3(*a,b*)).

Figures 4A, 4B, 4C, 4D:
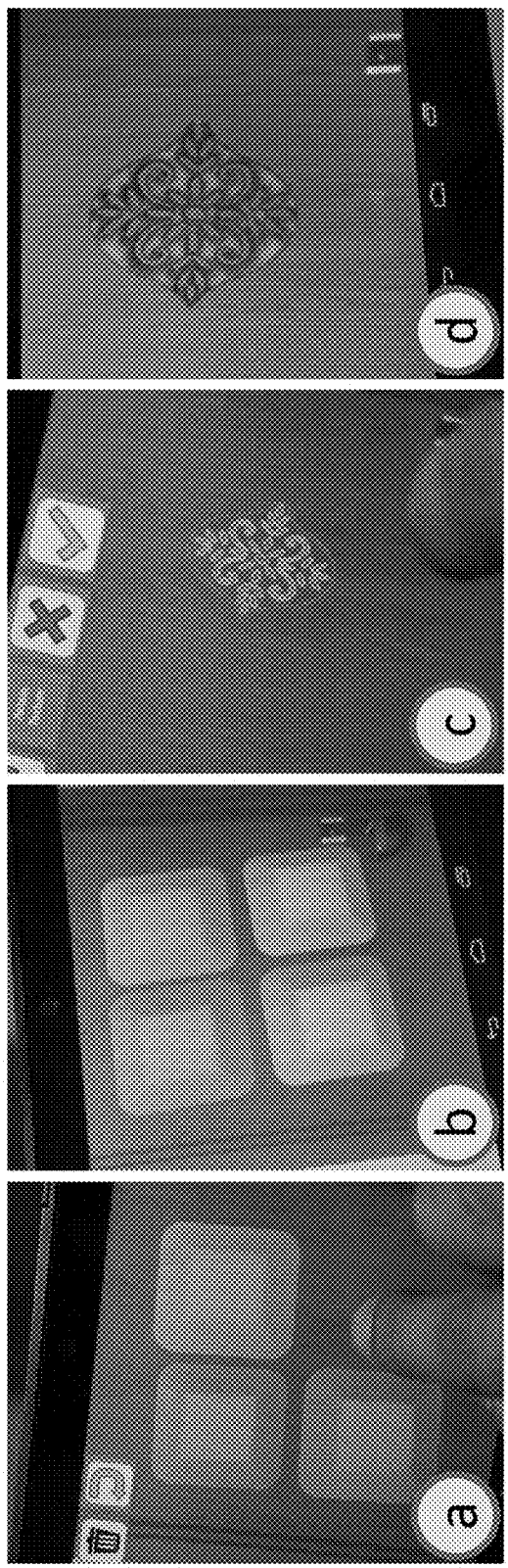
FIG. 4a shows use of a virtual reality system wherein a user creates a tapered inflated shape with a template in the curve mode and inflates it.
FIG. 4b shows the use of the virtual reality system wherein the user patterns the shape.
FIG. 4c shows the user exploring complex features.
FIG. 4d shows the user further exploring the complex shape according to one embodiment.

Placing Curve Template:

As an alternative to direct drawing, the presently disclosed system 1800 also provides a set of curve templates (e.g. polygonal primitives, hole patterns) that users can select from (FIG. 4). Once a template is selected, users can simply place them on any surfaces of physical or virtual objects using a single-tap gesture. The curve is placed on a fitted 3D plane around the single-tapped location. The curve template feature allows for quick exploration of complex ideas with minimal interaction effort (FIG. 4(*c,d*)).

Figures 5A, 5B, 5C:
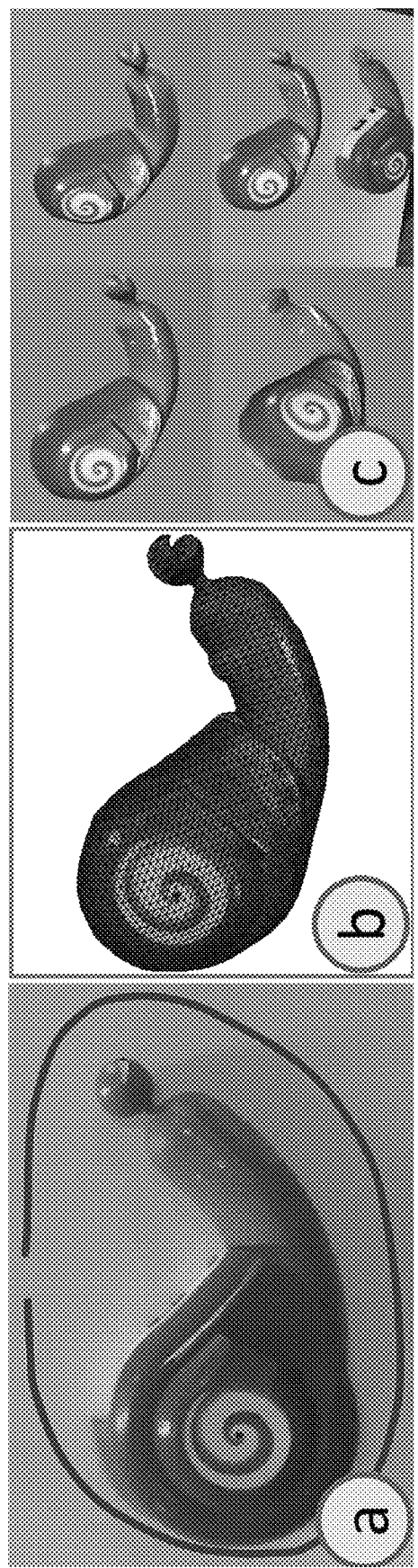
FIG. 5a shows use of a virtual reality system wherein a user has captured outline and texture of a snail shape by drawing ROI around the physical object.
FIG. 5b shows a circular inflated shape using the captured outline.
FIG. 5c shows an extruded shape using the captured outline and textured with the segmented snail shape according to one embodiment.
Figure 6B:
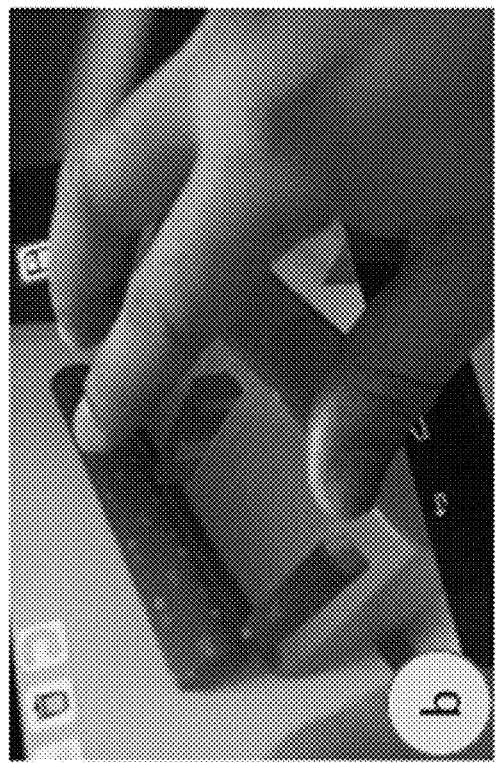
FIG. 6b shows the use of a 3-finger gesture which allows for modifying the inflation of a 3D shape.
Figure 6A:
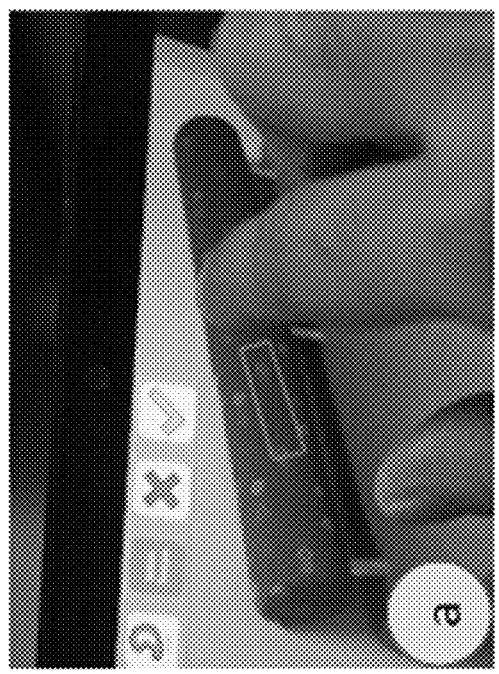
FIG. 6a shows an example of a 2D transformation according to one embodiment.
Figure 6D:
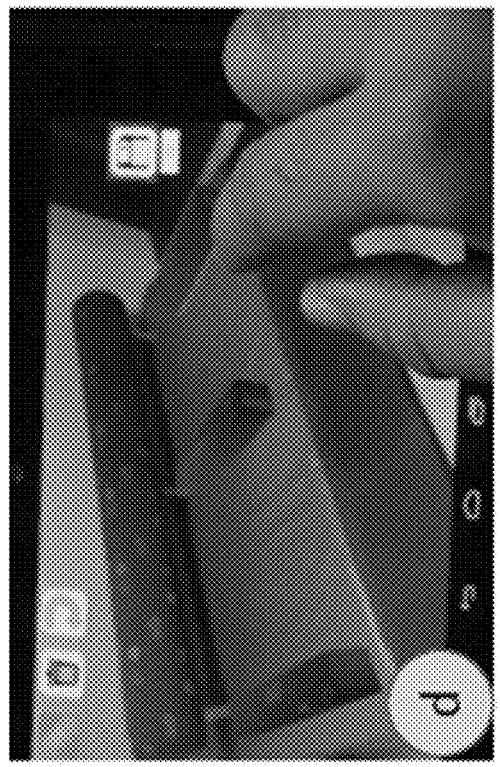
FIG. 6d shows an example of a further transformation.
Figure 6C:
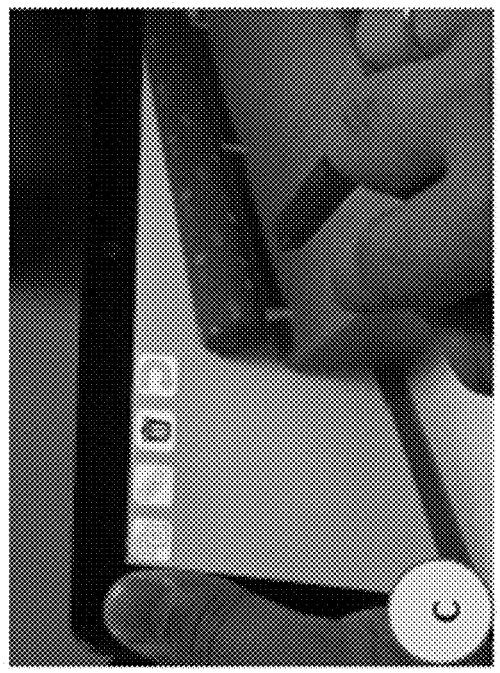
FIG. 6c shows an example of a 3D transformation according to one embodiment.

Capturing Outlines:

The presently disclosed system 1800 also allows users to extract the outline of the object from the scene in the image space (FIG. 5). This feature makes use of the well-known GrabCut algorithm. for image fore-ground detection. User first defines a region of interest (ROI) with free finger drawing, then within the ROI, the system 1800 detects the contour of the foreground and use it to create the inflated mesh. This automatic approach of shape creation enables users to directly use the visual representation (outline shape and texture) of a physical object and re-purposing it in 3D form in their own designs.

Editing Shapes:

Users can edit a shape by simply editing the input curve (FIG. 6(*c*)). Window-Shaping uses the over-sketching interaction technique to enable intuitive and quick curve editing. This interaction allows users to modify a shape's geometry, add details, or improve its appearance. Users can simply draw a new curve segment in proximity to a desired existing curve segment using one finger interactions.

The use of RGB-XYZ representation enables multi-scale curve editing, i.e. the capability to vary the distance between an object and the tablet while still maintaining the dimensions of the curve in physical space. Moving the tablet closer to a desired region allows for precise virtual operations in screen-space allowing users to create fine features on curves. On the other hand, moving the tablet away from a physical surface allows for better overview that is valuable for coarse operations such as placing shapes and curve templates on desired locations (FIG. 6 (*b,c*)).

Inflating and Deflating:

The system 1800 provides 3-finger pinch/spread gesture for allowing users to inflate or deflate a 3D mesh. The users pinch to inflate which mimics pulling material out from the screen, and spread to deflate as pushing into the screen. We perform an additive inflation, e.g., the additive amount is a function of the area of the triangle formed by 3 finger tips in pixel space.

Rotations and Scaling:

Two-finger rotate and pinch/spread are used for rotating and scaling the shape respectively. The rotation angle and pinch distance are both calculated in pixel space. These gestures can be applied either directly to the 3D shape (in the shape mode or to the underlying curve of the shape (in the curve mode. The two-finger interaction constrains all rigid transformation the plane of the curve.

Translation:

The in plane translation is performed by simply dragging a shape using one finger. This allows for precise placement of the shape on the plane of its underlying curve. To maintain the consistency of dimensional perception, we project the finger movement onto the underlying plane instead of using constant mapping between pixel space and physical space.

Placement:

Shape placement allows users to directly transfer a selected 3D shape to any point in the scene by using a one-finger tap gesture. Here the 3D shape is both translated to the specified point and re-oriented along the normal at this point. Similarly to placing the template curve, the users can place a new virtual object on the physical scene as well as on an existing virtual object based on the closest point of selection. This maintains a perceptual depth consistency during interactions.

Auxiliary Operations In addition to geometric operations, the presently disclosed system 1800 provides operations such as copying and deleting a shape. We also implemented a manual patterning operation. Users can select and make copy/pattern of the shape at arbitrary locations by using the shape placement gesture.

During the over-sketching operation, the presently disclosed system 1800 automatically update the texture image to maintain the visual consistency. In contrast, the texture is not updated during the rigid transformation of shape. This allows for re-purposing the appearance from one object to another object. Additionally, the system 1800 provides an option where the user can explicitly choose to update the texture even during rigid transformations. This can be a helpful when users are experimenting with different backgrounds for the same shape.

Curve Processing:

The system allows all curves to be closed, simple and oriented. Additionally, the system 1800 also prefers the curves to be smooth while preserving features such as corners. Following this guideline, the system performs the processing in four steps. (1) We apply an exponential smoothing filter to the points drawn by the user. This is implemented while the user is drawing the curve on the screen. (2) We determine if the curve is open or closed based on a distance threshold between the end-points of the curve input. We discard an open curve as an invalid input. (3) For a closed curve, we perform an equidistant curve re-sampling (4) All boundary curves are required to be oriented counter-clockwise (positive bounded area) while all holes must be clockwise (negative). The system 1800 corrects the wrong curve orientation by reversing the order of points.

Figure 7:
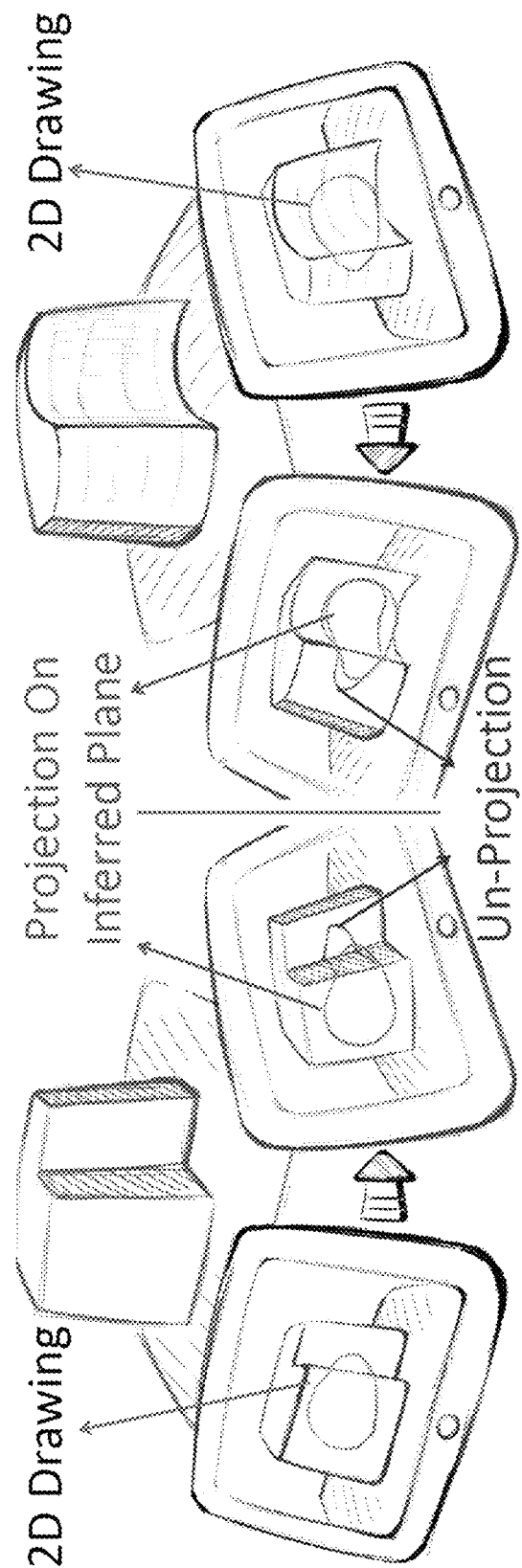
FIG. 7 shows an illustration of plane inference: direct un-projection of 2D drawing results a discontinuous curve (right), and projection on the inferred plane (right).

Plane Inference and Un-Projection:

With the organized RGB-XYZ data, the system 1800 first un-projects each point of the processed curve into the physical space. The system 1800 obtains 3D position of each point, fit plane within the neighborhood of each point, and get associated normal. Based on the standard deviation of the distances between adjacent points, the system 1800 categorizes the drawings into (1) continuous curve; and (2) discontinuous curve. For (1) the system 1800 determines the plane by averaging the position and normals of these points. However for (2), this simple averaging results unpredictable planes as shown in FIG. 7. To address this issue, the system 1800 clusters the points into groups with small euclidean distances and normal differences, e.g., continuous segments on the same plane and select the segment with most points. Then, the plane is determined by the points on this segment.

Mesh Generation:

Given the processed boundary and hole curves, the inflated mesh generation is performed in three steps: (1) computing two symmetrically aligned open (half) meshes bounded by the curves (boundary and holes) through constrained delaunay triangulation (CDT), (2) topologically stitching these two open meshes to create a closed mesh, and (3) inflating the top half mesh using the distance transform function. CDT is implemented using the poly2tri library Unlike extruded primitive, the round, conical and tapered primitives require internal sampling of points before CDT. For this, the system 1800 instantiates a uniform equilateral point sampling inside the region bounded by the curves. These points are added as Steiner points for obtaining a regularly samples triangulation.

Figures 8A, 8B, 8C, 8D:
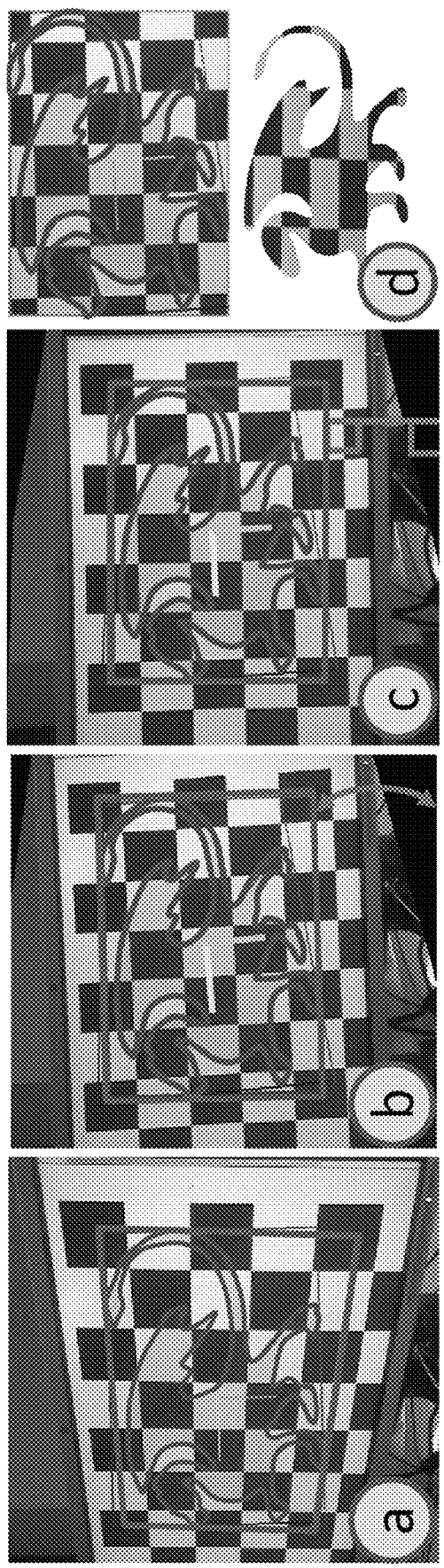
FIG. 8a shows a first step for creating a texture by projecting the bounding rectangle of the 3D planar curve.
FIG. 8b shows a second step for creating the texture by image skewing.
FIG. 8c shows a third step for creating the texture by rotation correction.
FIG. 8d shows a fourth step for creating the texture by image cropping.

Texture Computation:

In one embodiment, the system 1800 implements texture generation for the inflated mesh using openCV in four steps (FIG. 8). Given the un-projected coordinates of a 3D planar curve, the system first computes its bounding rectangle in 3D space and project it on the image space. Then, the system applies a skew transformation on this image with the constraint that the projected bounding rectangle is axis-aligned with the image. In the third step the system 1800 rotates the skewed image to correct the residual angle between the rectangle and the image. Finally, the system 1800 crops the image using this projected bounding rectangle to obtain the texture image of the inflated mesh.

The design work flow and interactions implemented using the presently disclosed system 1800, can potentially cater to different kinds of design contexts. As nonlimiting examples, four distinct design patterns are described below for the three examples from FIG. 9.

Figures 10A, 10B, 10C, 10D:
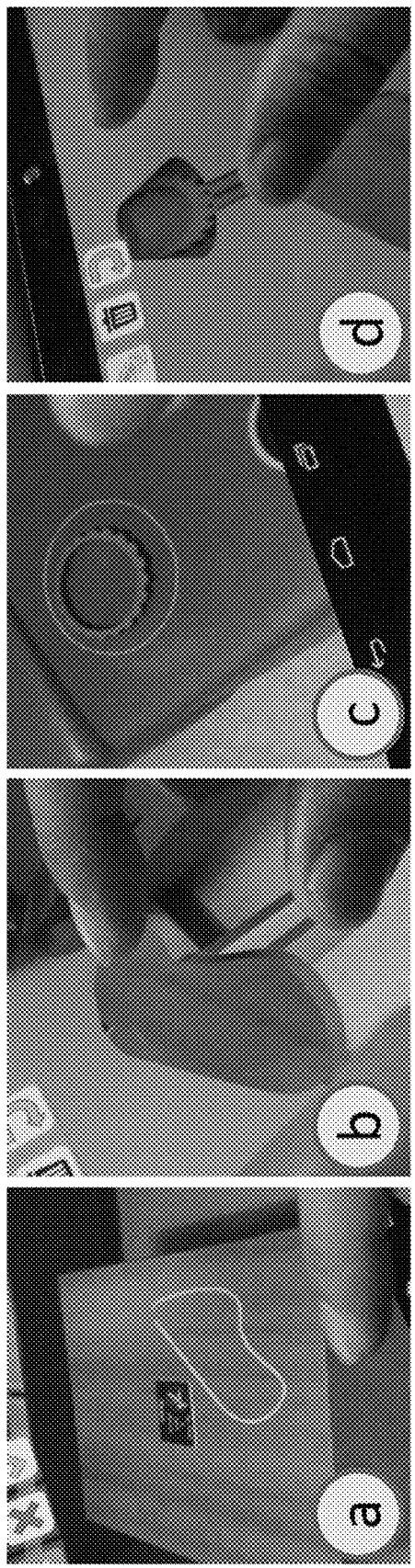
FIG. 10a shows first step of a furniture design use case wherein a virtual side-table is created by borrowing the texture from a physical table.
FIG. 10b shows second step of a furniture design use case wherein a virtual side-table is created by borrowing the texture from the physical table.
FIG. 10c shows a third step wherein the surrounding objects are then used to explore the lamp design.
FIG. 10d shows a fourth step wherein the lamp design is further captured
Figures 10E, 10F, 10G, 10H:
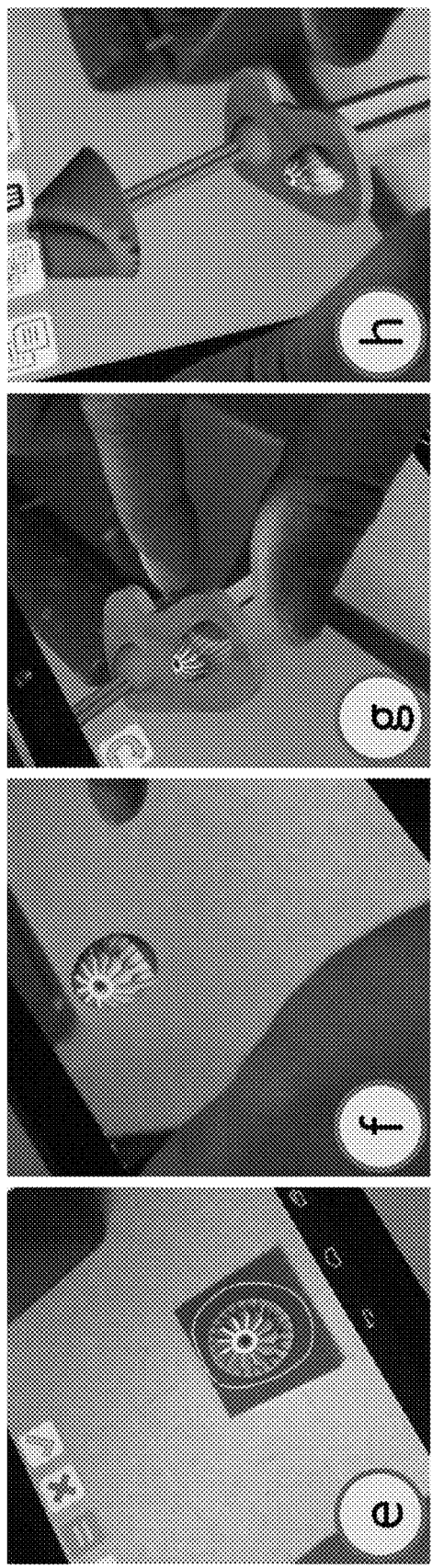
FIG. 10e shows a fifth step wherein GrabCut is applied to capture the outline and texture.
FIG. 10f shows a sixth step wherein GrapCut has been applied.
FIG. 10g shows a seventh step wherein a decorative object is formed.
FIG. 10h shows an eighth step wherein the object is manipulated in the virtual environment.

The most fundamental design capability offered by the presently disclosed system 1800 is creating new geometric features on existing objects. These existing objects can be both physical and virtual objects. For instance, in an interior design scenario, a user could add complementary features to a piece of furniture (FIG. 10(*a,b*)) and also create virtual additions to the scene by adding new assemblies to the surrounding area (FIG. 10(*g,h*)).

Re-purposing Physical Objects: By re-purposing, we mean the use of both the shape and the appearance of a physical object to create a new design feature. Here, the GrabCut algorithm serves as a means for design inspiration by allowing users to borrow shape and appearance from in the surrounding environment can be used to re-purpose both the shape and appearance of a physical object for direct use in an existing mixed-reality scene.

Figures 12A, 12B, 12C, 12D:
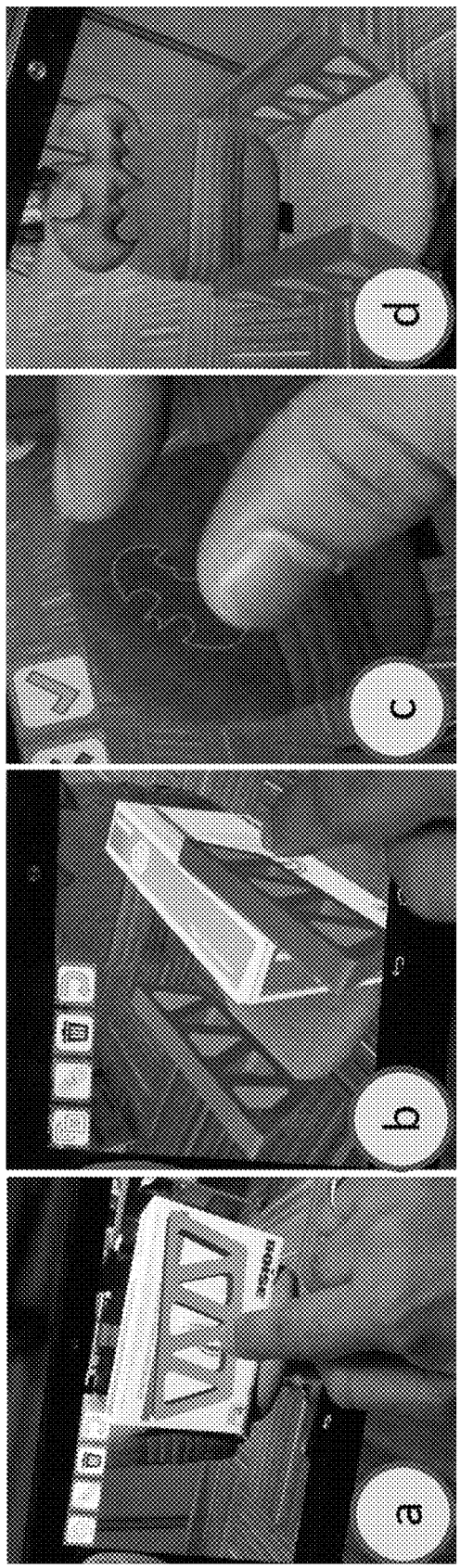
FIG. 12a shows a first step in a process wherein a virtual shape is created on a metal shelf being placed as an arm-rest on the sides of a chair.
FIG. 12b shows a second step in the process wherein the virtual shape is created on the metal shelf being placed as an arm-rest on the sides of the chair.
FIG. 12c shows a third step in the process wherein the virtual shape is created on the metal shelf being placed as an arm-rest on the sides of a chair.
FIG. 12d shows a fourth step in the process wherein the virtual shape is created on a metal shelf being placed as an arm-rest on the sides of the chair. Placing a box at the appropriate location on the seat allows for proper placement and orientation of the handle in a simple manner.

Using Physical Objects as Spatial References In situations where users wish to fill in a blank space to augment a physical product, it can be helpful to use another physical object to define a reference plane (FIG. 12). The user of objects as references enables a direct, tangible, and spatially coherent way of designing in context. Once the virtual object is placed appropriately, the reference object can simply be removed from the scene.

Figures 11D, 11E, 11F:
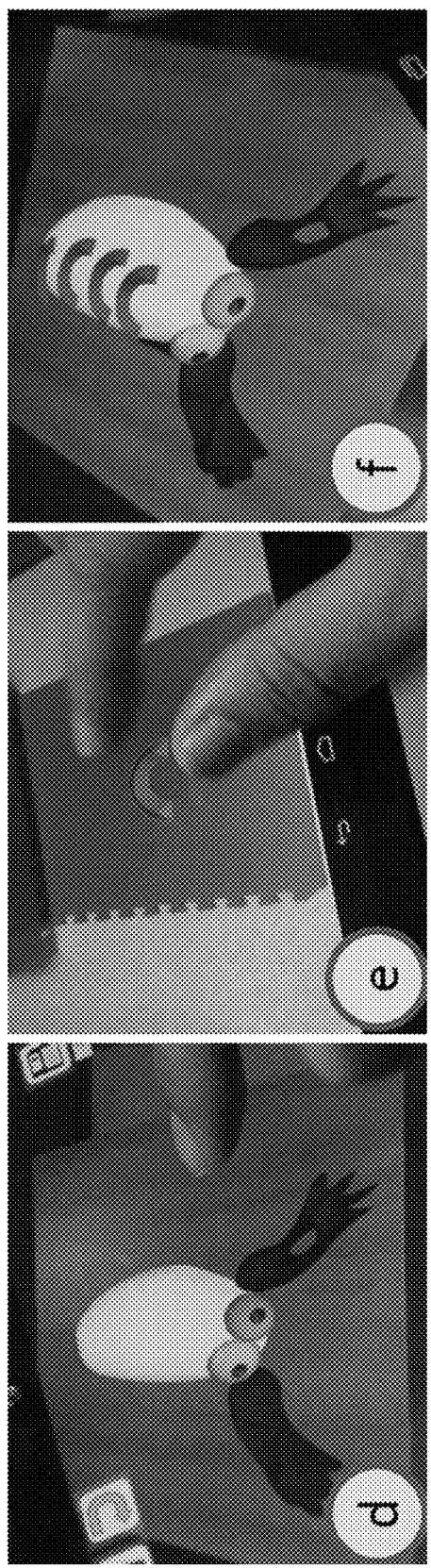
FIG. 11d shows a fourth step wherein the creature elements are assembled.
FIG. 11e shows a fifth step wherein the scales of the creature are created from a scaled mat.
FIG. 11f shows a sixth step wherein the scales are patterned on the body of the creature.

Using Physical Objects as Visual References The variety of ideas generated during early design depends not just on the geometric aspects but also the appearance of the design. The appearance can serve for both aesthetic as well as functional purposes (such as material specification). In Window-Shaping, users can quickly experiment with the appearance of a virtual model. Such experiments can be performed either by transferring the virtual shape to a new location and re-texturing or by simply changing the background texture of a sketched curve (FIG. 11).

Figure 13:
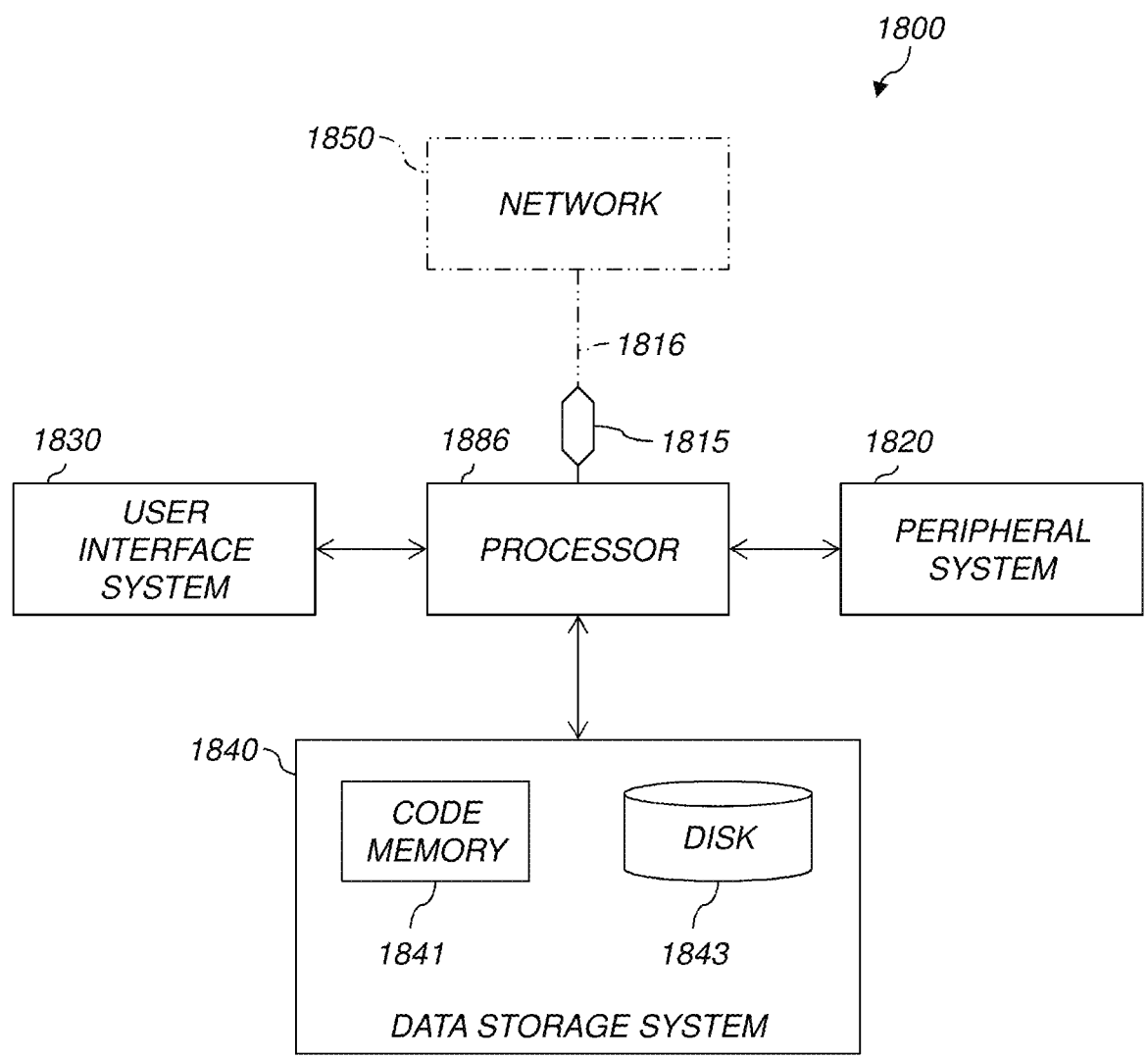
FIG. 13 shows a virtual reality system according to one embodiment.

FIG. 13 is a high-level diagram showing the components of one example of the system 1800 for analyzing data and performing other analyses described herein, and related components. The system 1800 includes a processor 1886, a peripheral system 1820, a user interface system 1830, and a data storage system 8. The peripheral system 1820, the user interface system 1830 and the data storage system 1840 are communicatively connected to the processor 1886. Processor 1886 can be communicatively connected to network 1850 (shown in phantom), e.g., the Internet or a leased line, as discussed below. It shall be understood that the system 1820 may include multiple processors 1886 and other components shown in FIG. 13. The virtual reality and object data described herein may be obtained using network 1850 (from one or more data sources), peripheral system 1820 and/or displayed using display units (included in user interface system 130) which can each include one or more of systems 1886, 1820, 1830, 1840, and can each connect to one or more network(s) 1850. Processor 1886, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1886 can implement processes of various aspects described herein. Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1820, user interface system 1830, and data storage system 1840 are shown separately from the data processing system 1886 but can be stored completely or partially within the data processing system 1886.

The peripheral system 1820 can include one or more devices configured to provide digital content records to the processor 1886. For example, the peripheral system 1820 can include digital still cameras, digital video cameras, cellular phones, or other data processors. The processor 1886, upon receipt of digital content records from a device in the peripheral system 1820, can store such digital content records in the data storage system 1840.

The user interface system 1830 can include a touchscreen, hand-held stylus, mouse, a keyboard, another computer (connected, e.g., via a network or a null-modem cable), or any device or combination of devices from which data is input to the processor 1886. The user interface system 1830 also can include a display device, a processor-accessible memory, or any device or combination of devices to which data is output by the processor 1886. The user interface system 1830 and the data storage system 1840 can share a processor-accessible memory.

In various aspects, processor 1886 includes or is connected to communication interface 1815 that is coupled via network link 1816 (shown in phantom) to network 1850. For example, communication interface 1815 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1815 sends and receives electrical, electromagnetic or optical signals that carry digital or analog data streams representing various types of information across network link 1816 to network 1850. Network link 1816 can be connected to network 1850 via a switch, gateway, hub, router, or other networking device.

Processor 1886 can send messages and receive data, including program code, through network 1850, network link 116 and communication interface 1815. For example, a server can store requested code for an application program (e.g., a JAVA applet) on a tangible non-volatile computer-readable storage medium to which it is connected. The server can retrieve the code from the medium and transmit it through network 1850 to communication interface 1815. The received code can be executed by processor 1886 as it is received, or stored in data storage system 1840 for later execution.

Data storage system 1840 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 1820), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1840 can be a tangible non-transitory computer-readable storage medium, i.e., a non-transitory device or article of manufacture that participates in storing instructions that can be provided to processor 186 for execution.

In an example, data storage system 1840 includes code memory 1841, e.g., a RAM, and disk 1843, e.g., a tangible computer-readable rotational storage device such as a hard drive. Computer program instructions are read into code memory 1841 from disk 1843. Processor 186 then executes one or more sequences of the computer program instructions loaded into code memory 1841, as a result performing process steps described herein. In this way, processor 1886 carries out a computer implemented process. For example, steps of methods described herein, blocks of the flowchart illustrations or block diagrams herein, and combinations of those, can be implemented by computer program instructions. Code memory 1841 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1886 (and possibly also other processors), to cause functions, acts, or operational steps of various aspects herein to be performed by the processor 1886 (or other processor). Computer program code for carrying out operations for various aspects described herein may be written in any combination of one or more programming language(s), and can be loaded from disk 1843 into code memory 1841 for execution. The program code may execute, e.g., entirely on processor 1886, partly on processor 186 and partly on a remote computer connected to network 1850, or entirely on the remote computer.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A virtual reality system, comprising:
   a display interface;
   a camera; and
   a processor, the processor configured to accept input to the system to instruct the system to create a virtual 3D object in a real-world environment displayed on the display interface, wherein the virtual 3D object is created with reference to at least one external physical object in the real-world environment, said external physical object concurrently displayed with the virtual 3D object by the interface, wherein the processor is configured to receive input from a user and modify the virtual 3D object to match one or more attributes of the physical object or another physical object in the real-world environment.

2. The system of claim 1, wherein the system is configured to interpret multi-touch input from the user via the display interface, the multi-touch input interpreted by the processor with spatial context using a relative location of the display interface with the real-world environment.

3. The system of claim 1, wherein the modified virtual 3D object is based on constraints or modifications supplied by the user.

4. The system of claim 1, wherein the display interface comprises an electronic display touchscreen and is activated by human touch, a stylus contact, or a combination thereof.

5. The system of claim 1, wherein a shape of the virtual 3D object is created based on a user sketch input on the display interface, the sketch input interpreted by the system as planar curves with respect to a physical environment context.

6. The system of claim 5, wherein the planar curves are defined as a 2D mesh mapped on to a physical object, and the 2D mesh is inflated to form the 3D virtual object.

7. The system of claim 1, wherein the system is configured to allow the user to select a shape from a menu of template shapes to create the virtual 3D object.

8. The system of claim 1, wherein the processor is configured to allow the user to select an object of interest in the physical world environment being displayed on the display interface, wherein the system extracts an outline and corresponding texture of the object of interest to create the virtual 3D object.

9. The system of claim 1, wherein the processor is configured to allow the user to scale, translate, rotate, and/or copy the 3D virtual object.

10. The system of claim 1, wherein the processor is configured to allow the user to edit curves in the 3D virtual object with over-sketching.

11. The system of claim 1, wherein to modify the virtual 3d object, the processor is configured to retexture the 3D virtual object with a texture copied from a physical world object being displayed on the display interface.

* * * * *